United States Patent [19]

Sugiyama et al.

[11] 4,078,933
[45] Mar. 14, 1978

[54] SILVER HALIDE PHOTOGRAPHIC LIGHT-SENSITIVE ELEMENT CONTAINING DYE

[75] Inventors: Masatoshi Sugiyama; Eiichi Kato, both of Minami-ashigara, Japan

[73] Assignee: Fuji Photo Film Co., Ltd., Minami-ashigari, Japan

[21] Appl. No.: 777,803

[22] Filed: Mar. 15, 1977

[30] Foreign Application Priority Data

Mar. 16, 1976 Japan .................................. 51-28795

[51] Int. Cl.² .................................................. G03C 1/84
[52] U.S. Cl. ...................................... 96/84 R; 252/300
[58] Field of Search ........................ 96/84 R; 252/300

[56] References Cited

U.S. PATENT DOCUMENTS

| 3,247,127 | 4/1966 | Bailey | 252/300 |
| 3,653,905 | 4/1972 | Depoorter et al. | 96/84 R |

*Primary Examiner*—John D. Welsh
*Attorney, Agent, or Firm*—Sughrue, Rothwell, Mion, Zinn and Macpeak

[57] ABSTRACT

A silver halide photographic light-sensitive element which comprises at least one silver halide emulsion layer and at least one hydrophilic colloid layer containing at least one dye represented by the following formula (I):

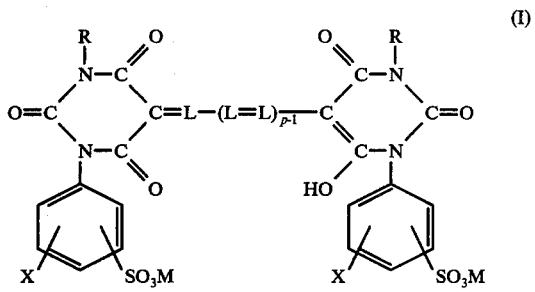

wherein R represents a hydrogen atom, an aliphatic hydrocarbon group, an aromatic hydrocarbon group or an aralkyl group; X represents a hydrogen atom, a halogen atom, an aliphatic hydrocarbon group, an alkoxy group, an alkylthio group or a substituted amino group; L represents a methine group; M represents a cation; and p represents an integer of 1 to 3. The dyes are useful in antihalation and filter layers, and can be decolorized readily and completely.

10 Claims, 1 Drawing Figure

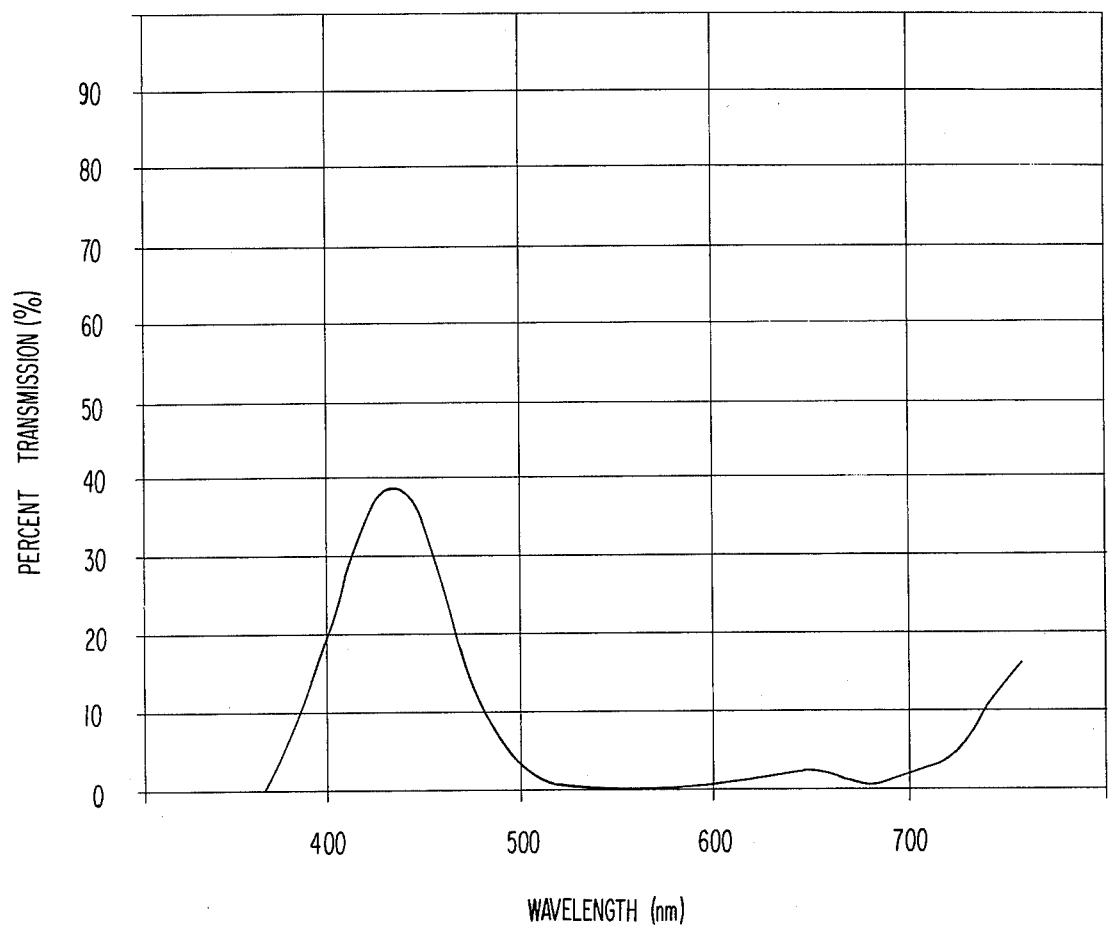

SILVER HALIDE PHOTOGRAPHIC LIGHT-SENSITIVE ELEMENT CONTAINING DYE

BACKGROUND OF THE INVENTION

1. Field of the Invention

The present invention relates to a silver halide photographic light-sensitive element containing a novel oxonol dye.

2. Description of the Prior Art

In silver halide photographic light-sensitive elements, photographic emulsion layers and other layers are often colored in order to absorb light in a particular wavelength region.

Where the spectral composition of the light incident upon a photographic emulsion layer or layers must be controlled, a colored layer may be positioned in a position more remote from the support than the photographic emulsion layer or layers. Such a colored layer is referred to as a filter layer. In photographic elements containing a plurality of photographic emulsion layers such as multilayer color light-sensitive elements, a filter layer may be positioned between two emulsion layers.

A colored layer may also be positioned between the support and the photographic emulsion layer, or on the side of the support opposite to that on which the emulsion is coated in order to prevent blurring of the image, i.e., halation, caused by re-entry into an emulsion layer of light that is scattered during or after transmission through the emulsion layer and reflected at the interface between the emulsion layer and the support. Such a colored layer is referred to as an antihalation layer. In photographic elements containing a plurality of photographic emulsion layers such as multilayer color light-sensitive elements, an antihalation layer may be positioned between two emulsion layers.

Dyeing of one or more photographic emulsion layers is also employed in order to prevent a reduction of the sharpness of the image due to the scattering of light in photographic emulsion layers. (This phenomenon is generally referred to as irradiation.)

Most of these colored layers comprise a hydrophilic colloid, and accordingly water-soluble dyes are usually incorporated thereinto to dye the layers. Dyes to be used for this purpose must have an appropriate spectral absorption property and, in addition, have to satisfy the following requirements:

(1) They should be photographically inert. That is, they should not chemically adversely affect the layers, such as reduce the sensitivity, fade the latent image and generate fog.

(2) They should remain in the dyed layer until the element is subjected to photographic processing. That is, they should have a good mordanting property. (3) They should be decolorized or removed by dissolving during photographic processing, leaving no harmful stain on the photographic light-sensitive element after the processing. That is, they should have a good bleachability.

Of the above requirements, the mordanting property (2) is the most important. Because, if the dye does not remain in the dyed layer, it may reduce the sensitivity of other photographic emulsion layers and cause a color imbalance among blue, green and red, which is undesirable for the reproduction of color.

Much effort has been made to find dyes which satisfy these requirements. Examples of known dyes include oxonol dyes containing a pyrazolone nucleus, such as those described in British Patent No. 506,385, Japanese Patent Publication Nos. 22,069/64 and 13,168/68, and Japanese Patent Application (OPI) No. 85,130/73; oxonol dyes containing a barbituric acid nucleus, such as those described in U.S. Pat. Nos. 3,247,127 and 3,653,905; other oxonol dyes as described in U.S. Pat. No. 2,533,472, British Patent No. 1,278,621 and French Patent No. 1,401,588; benzilidene- (or cinnamylidene)- pyrazolone dyes, such as those described in British Patent No. 584,609, U.S. Pat. Nos. 3,540,887, 3,615,546 and 3,687,670, and French Patent Nos. 1,350,311 and 1,421,679; and merocyanine dyes, such as those described in British Patent Nos. 1,075,653 (the one represented by general formula (IV)), 1,153,341 and 1,284,730, and French Patent No. 1,401,588 (the ones represented by general formula (II)).

However, no dye is known which simultaneously satisfies the above three requirements. In particular, most of the known dyes do not have satisfactory mordanting properties. Oxonol dyes containing barbituric acid nuclei as described in U.S. Pat. Nos. 3,247,127 and 3,653,905 can not be said to be satisfactory in both mordanting and decolorizing properties.

SUMMARY OF THE INVENTION

A first object of the invention is to provide dyes for use in coloring photographic layers, which dyes have a good mordanting property and can be rapidly and completely decolorized during photographic processing.

A second object of the invention is to provide a multilayer color light-sensitive element having a reduced degree of halation, an improved sharpness and a good color reproduction.

A third object of the invention is to provide a light-sensitive element of the graphic arts type having improved sharpness and dot quality.

A fourth object of the invention is to provide a light-sensitive element which gives rise to only limited pollution problems in discharge of processing and washing solutions.

These and other objects of the invention are accomplished with novel oxonol dyes represented by the following formula (I):

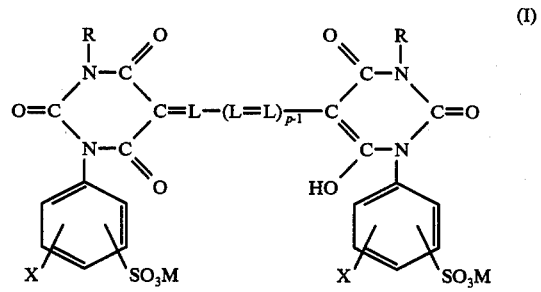

wherein R represents a hydrogen atom, an aliphatic hydrocarbon group containing 1 to 12 carbon atoms, an aromatic hydrocarbon group or an aralkyl group; X represents a hydrogen atom, a halogen atom, an aliphatic hydrocarbon group, an alkoxy group, an alkylthio group or a substituted amino group; L represents a methine group; M represents a cation; and p represents an integer of 1 to 3.

BRIEF DESCRIPTION OF THE ACCOMPANYING DRAWING

The FIGURE shows the spectral transmission of an Sp-1 Filter, produced by the Fuji Photo Film Co., Ltd. as used in the Examples.

DETAILED DESCRIPTION OF THE INVENTION

In the above general formula (I), R represents a hydrogen atom; an aliphatic hydrocarbon group such as an alkyl group containing 1 to 12 carbon atoms (e.g., methyl, ethyl, n-propyl, n-butyl, n-hexyl, n-octyl, isopropyl, isoamyl, n-dodecyl, etc.), a cycloalkyl group containing 4 to 6 carbon atoms (e.g., cyclohexyl); an aralkyl group containing 7 to 10 carbon atoms (e.g., benzyl, phenethyl, etc.); or an aromatic hydrocarbon group such as a phenyl group or a substituted phenyl group such as those substituted, for example, with one or more of a halogen atom (e.g., chlorine, bromine, etc.), an alkyl group containing 1 to 3 carbon atoms or an alkoxy group (e.g., 3-chlorophenyl, 4-methoxyphenyl, 4-tolyl, etc.).

X represents a hydrogen atom, a halogen atom (e.g., chlorine, bromine, etc.), an aliphatic hydrocarbon group such as a lower alkyl group containing 1 to 5 carbon atoms (e.g., methyl, ethyl, propyl, etc.), an alkoxy group containing 1 to 5 carbon atoms (e.g., methoxy, ethoxy, butoxy, etc.), an alkylthio group containing 1 to 5 carbon atoms (e.g., methylthio, ethylthio, etc.), or a substituted amino group (which may be either mono- or di-substituted) substituted, for example, with an alkyl group (e.g., containing 1 to 3 carbon atoms such as methyl, ethyl, etc.), an acyl group (e.g., containing 2 to 4 carbon atoms such as acetyl, propionyl, etc.), and the like.

M represents a hydrogen ion, an alkali metal cation (e.g., a sodium cation, a potassium cation, etc.), an alkaline metal cation (e.g., a calcium cation, a barium cation, etc.), an ammonium, or an organic onium cation (e.g., triethylammonium, pyridinium, piperidinium, morpholinium, etc.).

$p$ represents an integer of 1 to 3.

L is preferably a methine group and one of the methine groups of the methine chain represented by $=L-(L=L)_p$ may be substituted with an alkyl group containing 1 to 3 carbon atoms (e.g., methyl, ethyl, etc.), a phenyl group, a benzyl group, a phenethyl group, or a halogen atom (e.g., chlorine, bromine, etc.).

The compounds included within the scope of the above general formula (I) are markedly superior in mordanting and decolorizing properties to known dyes. Among the compounds included in the above general formula (I), those in which R is an alkyl group containing 1 to 12 carbon atoms or a cycloalkyl group have a particularly superior decolorizing property.

By an appropriate choice of the substituents, the characteristics of the novel dyes of the invention with regard to absorption range, solubility and resistance to diffusion can be achieved as desired.

The following examples are given as representative dyes of the present invention. However, it is to be understood that the invention is not to be construed as being limited to these specific dyes.

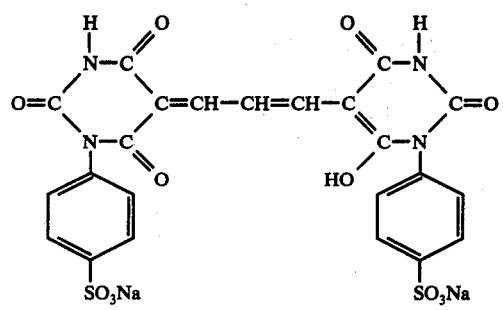

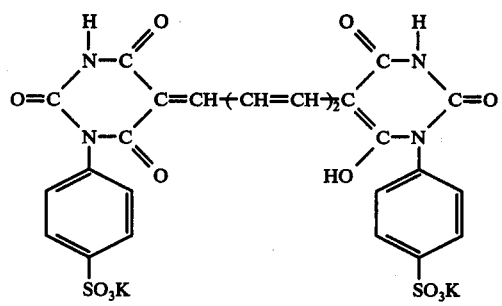

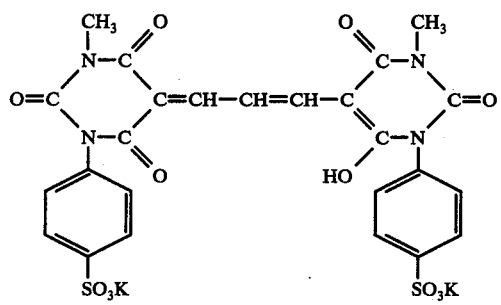

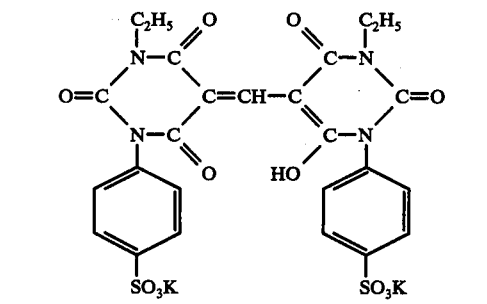

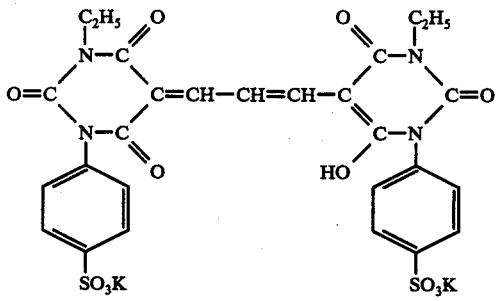

6.
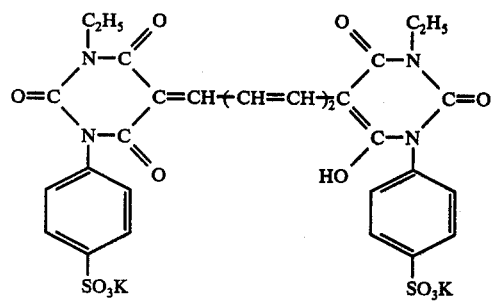
7.
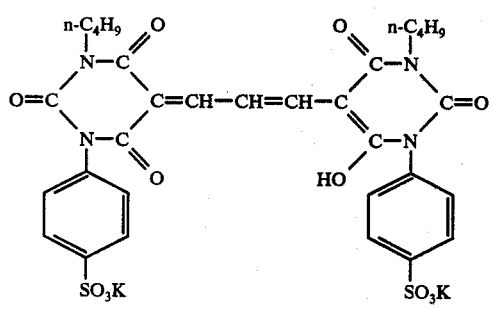
8.
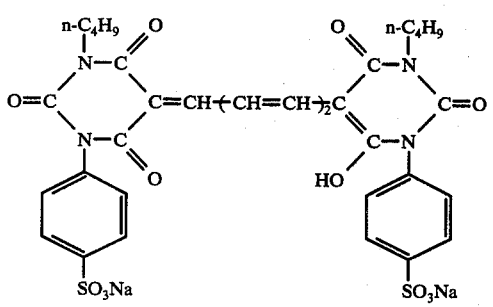
9.
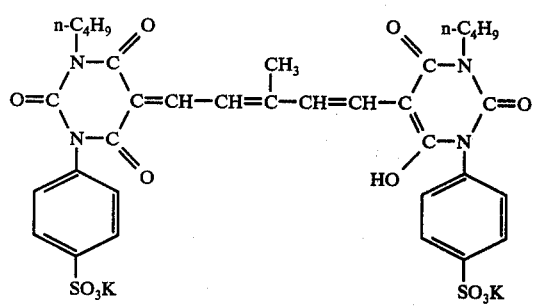
10.
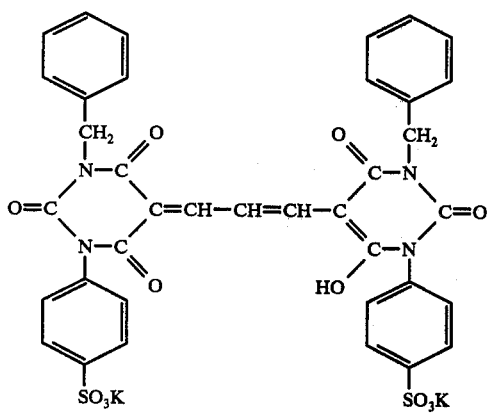
11.
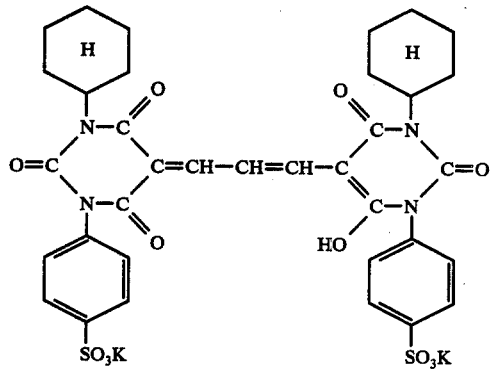
12.
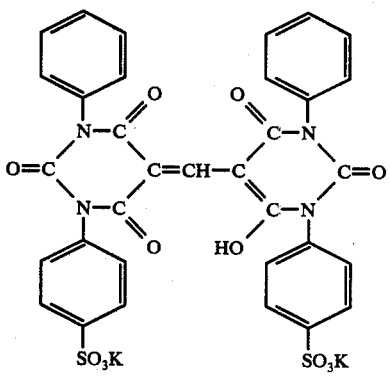
13.
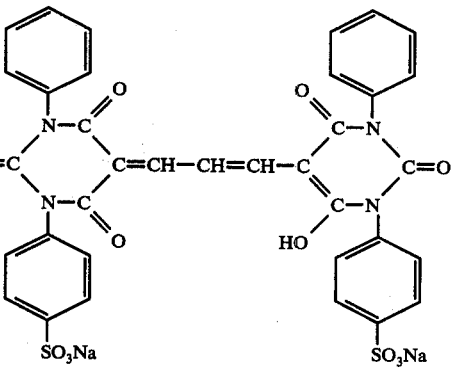
14.
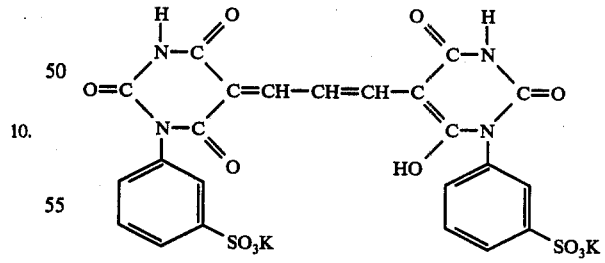
15.
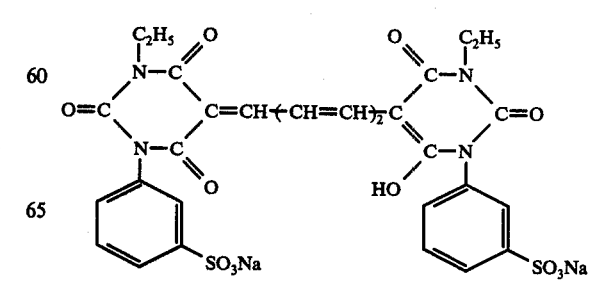

16. 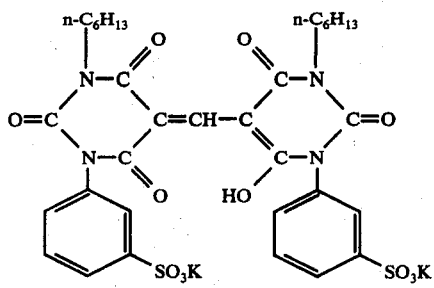

17. 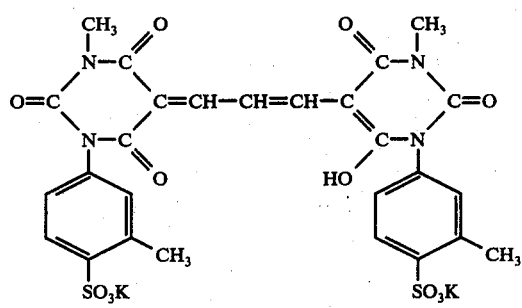

18. 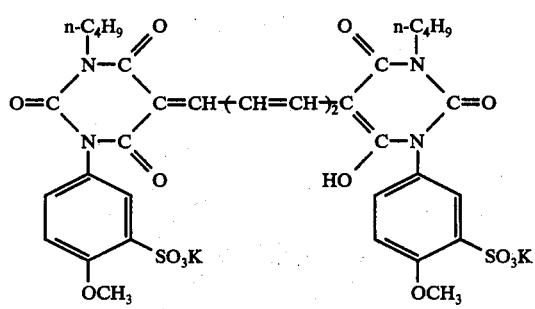

19. 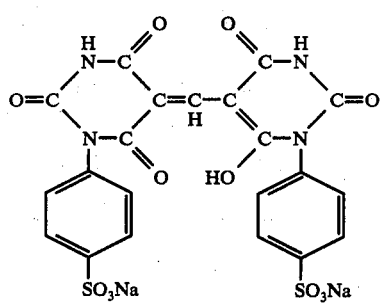

20. 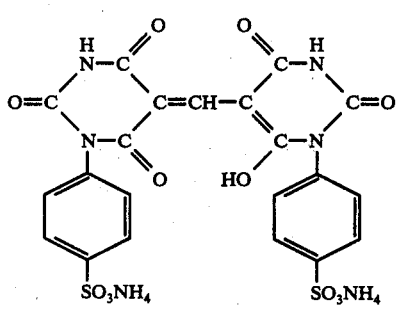

21. 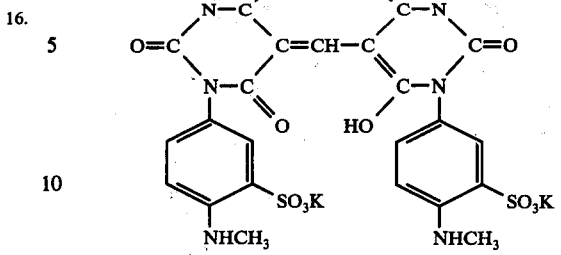

By the introduction of sulfophenyl groups into the barbituric acid nuclei of the dyes used in the invention, the mordanting properties of the dyes can be greatly improved without adversely affecting their decolorizing properties, compared with known dyes, including those in which a sulfoalkyl group is introduced into barbituric acid nuclei such as those described in U.S. Pat. No. 3,653,905. The mordanting property can further be improved by the use of dyes in which R defined by general formula (I) of the invention is a phenyl group.

Accordingly, it can be said that the dyes used in the invention are superior in mordanting and decolorizing properties to known dyes.

The novel oxonol dyes according to the invention can be prepared by allowing a barbituric acid having appropriate substituents to react with a compound which is known in the art as an agent for introducing a methine group or a methine chain into a methine dye, in the presence of an organic base such as triethylamine, pyridine, piperidine, morpholine or the like. The details of compounds of this kind are described in U.S. Pat. No. 3,493,375.

Specifically, ethyl orthoformate, ethyl orthoacetate, or N,N-diphenylformamidine hydrochloride can be used for the introduction of a monomethine group; trimethoxypropene, tetramethoxypropane or malondialdehyde dianil hydrochloride can be used for the introduction of a trimethine chain, and glutacondialdehyde dianil hydrochloride can be used for the introduction of a pentamethine chain.

The following synthesis examples are given to illustrate the synthesis of representative examples of dyes of the general formula (I). Unless otherwise indicated herein, all parts, percents, ratios and the like are by weight.

SYNTHESIS EXAMPLE 1 (DYE 1)

A suspension of 5.7 g of N-(4-sulfophenyl)barbituric acid, 1.7 g of tetramethoxypropane and 10 ml of pyridine was heated under reflux with stirring in order to dissolve it. Trimethylamine (2.5 g) was added dropwise to the solution and the solution was stirred for 10 minutes. The reaction mixture was cooled to 20° C with water, 500 ml of acetone was added to the mixture, and the resulting mixture was well stirred. The oil formed was then separated by decantation. The oil was dissolved in 15 ml of methanol, a solution of 2.5 g of sodium iodide in 10 ml of methanol was added to the solution, and then the resulting mixture was cooled to 10° C with ice-water. The precipitated crystals were collected by filtration, washed thoroughly with acetone, and dried to obtain 4.3 g of reddish brown crystals. An aqueous solution of this dye had a red color and an absorption maximum at 490 nm.

SYNTHESIS EXAMPLE 2 (DYE 2)

A mixture of 5.7 g of N-(4-sulfophenyl)barbituric acid, 2.4 g of glutacondialdehyde dianil hydrochloride, 50 ml of pyridine and 10 ml of triethylamine was heated to 90° C on a steam-bath for 30 minutes, with stirring. The reaction mixture was filtered hot, a solution (20 ml) of 2.0 g of anhydrous potassium acetate in methanol was added to the filtrate, and the resulting mixture was cooled with ice-water to 10° C. The precipitated crystals were collected by filtration, washed thoroughly with acetone, and dried to obtain 4.1 g of blue crystals. An aqueous solution of this dye had a bluish purple color and an absorption maximum at 589 nm.

SYNTHESIS EXAMPLE 3 (DYE 4)

A mixture of 6.2 g of N-ethyl-N'-(4-sulfophenyl)barbituric acid, 3.0 g of ethyl orthoformate, 80 ml of pyridine and 6.0 g of triethylamine was heated under reflux for 15 minutes, with stirring. A solution (20 ml) of 2.0 g of anhydrous potassium acetate in methanol was added to the mixture and the resulting mixture was stirred for 5 minutes at a temperature of from 50° to 60° C. After the reaction mixture had been cooled to room temperature with water, the precipitated crystals were collected by filtration, washed thoroughly with acetone, and dried to obtain 4.6 g of yellow crystals.

An aqueous solution of this dye had a yellow color and an absorption maximum at 419 nm.

SYNTHESIS EXAMPLE 4 (DYE 5)

A mixture of 6.2 g of N-ethyl-N'-(4-sulfophenyl)barbituric acid, 2.5 g of malondialdehyde dianil hydrochloride, 10 ml of triethylamine and 50 ml of methanol was heated under reflux for 30 minutes with stirring. A solution (20 ml) of 2.0 g of anhydrous potassium acetate in methanol was added to the mixture, and the resulting mixture was stirred for 5 minutes and cooled to 20° C with water. The precipitated crystals were collected by filtration, washed thoroughly with acetone, and dried to obtain 4.8 g of reddish brown crystals.

An aqueous solution of this dye had a reddish brown color and an absorption maximum at 490 nm.

SYNTHESIS EXAMPLE 5 (DYE 6)

A mixture of 6.2 g of N-ethyl-N'-(4-sulfophenyl)barbituric acid, 2.8 g of glutacondialdehyde dianil hydrochloride, 15 ml of triethylamine and 50 ml of methanol was heated under reflux for 20 minutes with stirring. A solution (20 ml) of 2.0 g of anhydrous potassium acetate in methanol was added to the mixture, and the resulting mixture was stirred for 5 minutes and cooled to 20° C with water. The precipitated crystals were collected by filtration, washed thoroughly with acetone, and dried to obtain 5.3 g of blue crystals.

An aqueous solution of this dye had a bluish purple color and an absorption maximum at 590 nm.

SYNTHESIS EXAMPLE 6 (DYE 8)

A mixture of 7.2 g of sodium N-n-butyl-N'-(4-sulfophenyl)barbiturate, 2.8 g of glutacondialdehyde dianil hydrochloride, 15 ml of triethylamine and 80 ml of methanol was heated under reflux for 30 minutes with stirring. The reaction mixture was condensed under reduced pressure at room temperature to one third of its original volume, and then 200 ml of isopropanol was added to the condensate. The precipitated crystals were collected by filtration, washed thoroughly with acetone, and dried to obtain 6.1 g of blue crystals.

An aqueous solution of this dye had a bluish purple color and an absorption maximum at 590 nm.

SYNTHESIS EXAMPLE 7 (DYE 15)

A mixture of 6.8 g of sodium N-ethyl-N'-(3-sulfophenyl)barbiturate, 2.8 g of glutacondialdehyde dianil hydrochloride, 15 ml of triethylamine and 80 ml of methanol was heated under reflux, with stirring. The reaction mixture was condensed under reduced pressure at room temperature to one third of its original volume, and then 200 ml of isopropanol was added to the condensate. The precipitated crystals were collected by filtration, washed thoroughly with acetone, and dried to obtain 5.0 g of blue crystals.

An aqueous solution of this dye had a bluish purple color and an absorption maximum at 590 nm.

Barbituric acids represented by the formula (III), an intermediate used in preparing the dyes of the present invention, may be prepared by allowing a urea derivative represented by the formula (II) to react with malonic acid in an equal molar amount with the urea derivative in the presence of acetic anhydride at the temperature of about 50° to about 150° C, as disclosed in U.S. Pat. Nos. 3,247,127 and 3,653,905. The urea derivatives represented by the formula (II) may be obtained by allowing an organic isocyanate or an inorganic cyanate, such as potassium isocyanate, etc., to react with an aromatic primary amine containing a sulfo group in a molar ratio of 1.0 : 1 to 1.5 : 1 in an aqueous alkaline solution (such as sodium hydroxide, potassium hydroxide, etc.) at a temperature of less than room temperature, as disclosed in Ber., 36, 3343.

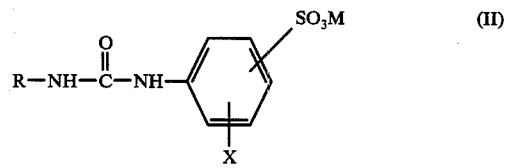

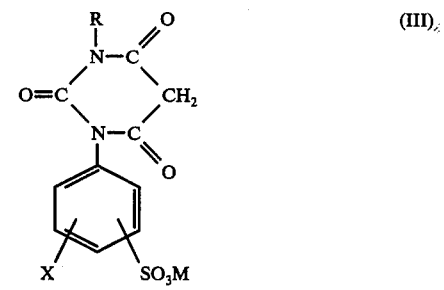

wherein R, X and M have the same meaning as in the formula (I) described above.

Specific examples of urea derivatives represented by the formula (II) are set forth below:

N-(4-Sulfophenyl)urea potassium salt
N-(4-Sulfo-3-methylphenyl)urea potassium salt
N-Ethyl-N'-(4-sulfophenyl)urea sodium salt
N-Ethyl-N'-(3-sulfophenyl)urea sodium salt
N-n-Butyl-N'-(4-sulfophenyl)urea sodium salt
N-n-Butyl-N'-(2-methoxy-4-sulfophenyl)urea potassium salt
N-Cyclohexyl-N'-(4-sulfophenyl)urea sodium salt N-Phenyl-N'-(4-sulfophenyl)urea
N-Cyclohexyl-N'-(3-chloro-5-sulfophenyl)urea sodium salt.

Specific examples of barbituric acids represented by the formula (III) are set forth below:

Potassium N-(4-sulfophenyl)barbiturate
Sodium N-(3-sulfophenyl)barbiturate
Sodium N-(3-chloro-5-sulfophenyl)barbiturate
N-Methyl-N'-(4-sulfophenyl)barbituric acid
N-Ethyl-N'-(4-sulfophenyl)barbituric acid
N-Ethyl-N'-(2-methyl-4-sulfophenyl)barbituric acid
Sodium N-n-butyl-N'-(4-sulfophenyl)barbiturate
Sodium N-cyclohexyl-N'-(3-sulfophenyl)barbiturate
N-Phenyl-N'-(4-sulfophenyl)barbituric acid
N-Cyclohexyl-N'-(3-chloro-5-sulfophenyl)barbituric acid
Sodium N-n-butyl-N'-(2-methoxy-4-sulfophenyl)barbiturate.

The following synthesis examples are given to illustrate the synthesis of representative examples of urea derivatives represented by the formula (II) and representative examples of barbituric acids represented by the formula (III).

SYNTHESIS EXAMPLE 8

(N-(4-Sulfophenyl)urea Potassium Salt)

A suspension of 21.3 g of sulfanilic acid, 12.5 g of potassium isocyanate and 150 ml of water was heated at a temperature of 85° to 90° C with stirring. The suspension dissolved immediately on heating. The solution was condensed under reduced pressure to a volume of about 1/3 the total volume and, then, 500 ml of ethanol was added thereto. The ethanol solution was cooled to less than 20° C with water. The precipitated crystals were collected by filtration, washed thoroughly with ethanol, and dried by heating under reduced pressure to obtain 29.9 g of white crystals. Melting point: above 300° C.

| $C_7H_7N_2O_4SK$ | C (%) | H (%) | N (%) |
|---|---|---|---|
| Calculated: | 33.05 | 2.76 | 11.02 |
| Found: | 33.30 | 2.64 | 10.95 |

SYNTHESIS EXAMPLE 9

(N-Ethyl-N'-(4-sulfophenyl)urea Sodium Salt)

17.3 g of sulfanilic acid and 4 g of sodium hydroxide were dissolved in 85 ml of water and then cooled to less than 20° C. Ethylisocyanate (7.1 g) was added dropwise to the solution with stirring and the solution was stirred for 3 hours. The solution was condensed under reduced pressure to remove water and 100 ml of acetone was added to the reaction mixture. The precipitated crystals were collected by filtration, washed thoroughly with ethanol and dried by heating under reduced pressure to obtain 21.6 g of white crystals. Melting point: above 300° C.

| $C_9H_{11}N_2O_4SNa$ | C (%) | H (%) | N (%) |
|---|---|---|---|
| Calculated: | 40.59 | 4.13 | 10.52 |
| Found: | 40.66 | 4.06 | 10.63 |

SYNTHESIS EXAMPLE 10

(Potassium N-(4-Sulfophenyl)barbiturate)

A mixture of 29.9 g of N-(4-sulfophenyl)urea potassium salt, 15 g of malonic acid and 200 ml of glacial acetic acid was heated to 60° to 70° C with stirring and 300 ml of acetic anhydride was added dropwise to the mixture. After about 50 ml of the acetic anhydride had been added, the mixture dissolved. After all of the acetic anhydride (300 ml) was added, the temperature of the reaction solution increased to 95° C. The reaction solution was stirred for 4 hours and then condensed under reduced pressure so as to precipitate crystals. 700 ml of ethanol was added to the condensed solution and the crystals were completely precipitated. The precipitated crystals were collected by filtration, washed thoroughly with ethanol and dried by heating under reduced pressure to obtain 34.5 g of crystals. The obtained crystals were recrystallized using a 90% methanol aqueous solution and, thereby, 29.3 g of white crystals was obtained. Melting point: above 300° C. Elemental Analysis:

| $C_{10}H_7N_2O_6SK$ | C (%) | H (%) | N (%) |
|---|---|---|---|
| Calculated: | 37.26 | 2.19 | 8.69 |
| Found: | 37.35 | 2.07 | 8.53 |

SYNTHESIS EXAMPLE 11

(Sodium N-Ethyl-N'-(4-sulfophenyl)barbiturate)

A mixture of 26.6 g of N-ethyl-N'-(4-sulfophenyl)urea sodium salt, 13.5 g of malonic acid and 150 ml of glacial acetic acid was heated and dissolved at 60° to 70° C. Acetic anhydride (200 ml) was added dropwise to the solution with stirring. After addition of the acetic anhydride, the temperature of the reaction solution increased to 95° C. The reaction solution was stirred for 6 hours and then condensed under reduced pressure so as to precipitate crystals. 700 ml of ethanol was added to the condensed solution and the crystals were completely precipitated. The precipitated crystals were collected by filtration, washed thoroughly with ethanol and dried by heating under reduced pressure to obtain 31.2 g of crystals. The crystals obtained were recrystallized using a 90% methanol aqueous solution and, thereby, 23.5 g of white crystals was obtained. Melting point: 290° C.

| $C_{12}H_{11}N_2O_6SNa$ | C (%) | H (%) | N (%) |
|---|---|---|---|
| Calculated: | 43.10 | 3.32 | 8.38 |
| Found: | 43.15 | 3.39 | 8.50 |

In the photographic light-sensitive elements of the invention, the dyes can be incorporated into one or more hydrophilic colloid layers in a conventional manner. That is, an aqueous solution of the dyes of an appropriate concentration may be added to an aqueous solution of a hydrophilic colloid, and the solution may be coated using a known method onto the support or onto the surface of another layer that constitutes the elements.

The selection of the amount of the dye to be added to the aqueous solution of a hydrophilic colloid can be made considering the solubility of the dyes, depending on purposes. In general, it is suitable to prepare an aqueous solution of the dyes at a concentration of about 0.5 to 3% by weight and to apply the solution to the elements at a dye coverage of about 8 to about 800 mg per m² of the surface area of the elements.

In the light-sensitive elements of the invention, the dyes can be advantageously added to a coating solution for a hydrophilic colloid layer containing a basic polymer upon coating the layer of the element. Further, the dyes may be added to a coating solution for other hydrophilic colloid layers, such as photographic emulsion layers or other light-insensitive layers. In the latter cases, it is preferable to incorporate the dyes into a layer that is as close as possible to the basic polymer-containing layer, desirably into a layer adjacent thereto. Even if the dyes are incorporated into a layer which does not contain a basic polymer, the dyes diffuse into the layer in which a basic polymer is present and are mordanted therein, so that the basic polymer-containing layer is selectively dyed in the finished light-sensitive elements. The dyes may be introduced into more than one layer, if desired.

In the light-sensitive elements of the invention, either a single or a plurality of hydrophilic colloid layers containing a basic polymer may be present, and such a layer or layers may be positioned on or above a photographic emulsion layer (i.e., a position more remote from the support) or, where a plurality of photographic emulsion layers is present, between two photographic emulsion layers, as well as at a position between a photographic emulsion layer and the support. The function of the layer selectively dyed with the aid of the presence of a basic polymer may be a filter layer or an antihalation layer as well as a layer having other functions, depending on its position in the elements.

The light-sensitive elements of the invention contain a basic polymer in at least one hydrophilic colloid layer. Examples of basic polymers which can be used are hydrophilic basic high molecular weight compounds which contain basic residues in their main or side chains, which are soluble in water and compatible with gelatin, and which are conventionally used for the mordanting of acidic dyes used for hydrophilic colloid layers of silver halide photographic light-sensitive elements. Examples of such polymers include polymeric compounds derived from ethylenically unsaturated compounds containing dialkylaminoalkyl ester residues such as those described in British Patent No. 685,475 and copolymers thereof such as those described in U.S. Pat. No. 2,839,401; copolymers of maleic anhydride and derivatives thereof such as those described in British Patent No. 906,083; polymers obtained by the reaction of polyvinylalkylketones with aminoguanidines such as those described in British Patent No. 850,281; polymers containing 2-methylimidazole nuclei in the side chains thereof such as those described in U.S. Pat. No. 3,445,231; addition polymers of bisacrylamides and secondary diamines or their quaternary salts such as those described in Japanese Patent Application (OPI) No. 24,733/73; ternary or quaternary copolymers containing polyvinyl pyridines or polyvinyl quinolines such as those described in British Patent Nos. 765,520 and 766,202; polymers described in German Patent Application (OLS) Nos. 1,914,361 and 1,914,362, and the like. Preferably the basic polymer is present in an amount such that about 4 to 20 basic functional groups in the basic polymer are present per mol of the oxonol dye of this invention.

In the light-sensitive elements of the invention, photographic emulsion layers and other hydrophilic colloid layers can contain ultraviolet light absorbents, such as those of the benzophenone, benzotriazole and thiazine series. These ultraviolet light absorbents may be mordanted in a particular layer in a similar manner as the dyes.

In the light-sensitive elements of the invention, photographic layers and other hydrophilic colloid layers can contain brightening agents, such as stilbenes, triazines, oxazoles and coumarins. Such brightening agents may be water-soluble or water-insoluble and used in the form of a dispersion.

In addition to the water-soluble dyes according to the invention, photographic emulsion layers and other hydrophilic colloid layers of the invention can contain simultaneously other known water-soluble dyes as long as they do not substantially impair the effects of the invention. It is of advantage to use two or more dyes in combination if the desired spectral absorption property can not be attained with a single dye. Examples of useful dyes include oxonol dyes such as those described in Japanese Patent Application (OPI) Nos. 85,130/73 and 5,125/74 and U.S. Pat. Nos. 3,247,127, 3,653,905, 2,533,472 and 3,379,533 and hemioxonol dyes such as those described in British Patent No. 584,609, U.S. Pat. No. 3,687,670 and French Patent No. 1,421,679. They can also contain alkali-soluble pigments such as manganese dioxide and bleachable pigments such as colloidal silver in combination with the dyes according to the invention.

In the light-sensitive elements of the invention, the hydrophilic colloid layers can contain compounds for prevention of color fog and interlayer color contamination in the case of color light-sensitive elements, including alkylhydroquinones, dialkylhydroquinones, aryl-substituted hydroquinones, sulfo-substituted hydroquinones, high molecular weight compounds containing hydroquinone residues, catechol derivatives, aminophenol derivatives, gallic acid derivatives and ascorbic acids, if required, in the form of a dispersion.

The silver halide photographic emulsion to be used for the light-sensitive material of the present invention can be prepared using various conventionally known techniques depending upon the end-use of the light-sensitive material so as to provide suitable characteristics.

Any of silver chloride, silver chlorobromide, silver bromide, silver bromoiodide, silver chlorobromoiodide and the like can be used as the silver halide, and the halogen content ratio is not particularly limited. As a protective colloid used upon formation of the silver halide, gelatin derivatives such as acylated gelatin (e.g., phthaloylated gelatin, succinoylated gelatin, etc.) and grafted gelatin prepared by grafting acrylamide or hydroxyalkyl (meth)acrylates; and high polymers such as a copolymer comprising three monomers, acrylic acid (or methacrylic acid), acrylamide (or methacrylamide) and an amine derivative of either of them (for example, N-(dialkylaminoalkyl)acrylamide), individually or in combination, as well as gelatin commonly used, can be employed.

Known processes can be employed for preparing the silver halide emulsion. For example, the principles and processes described in C. E. K. Mees & T. H. James, *The Theory of the Photographic Process,* 3rd Ed., Macmillan Co., New York (1966); P. Glafkides, *Chimie Photographique,* 2nd Ed., Photocinema Paul Montel, Paris (1957); H. Frieser, *Die Grundlagen der Photographische*

*Prozesse mit Silberhalogeniden,* Vol. 2, pp. 609 – 674 and 735 – 743, Akademische Verlaggesellschaft, Frankfurt-am-Main (1968); and the like can be used. Any of an acidic process, a neutral process and an ammoniacal process can be used, and a single jet or a double jet process (also called a twin jet process) can be used. The so-called controlled double jet process as described in *Berichte der Bunsengesellschaft fur Physikalische Chemie,* Band 67, p. 349 et seq., (1963) can be used as the occasion demands. Such a process is advantageous for obtaining an emulsion having an extremely narrow grain size distribution. The silver halide grains can be in any of a cubic form, an octahedral form, a tetradecahedral form (both of the foregoing two forms coexisting), various twin forms or in a mixed form thereof. The silver halide emulsion can contain either coarse grains or fine grains, with the mean value of the grain diameter or edge length (or a corresponding value showing the grain size) (numerical average measured according to a projection method) being less than about 0.2 μm, about 0.2 to 1 μm, and more than about 1 μm. The grain size distribution (with the grain size being in the sense as described above) can be either narrow or broad. The silver halide emulsion can be either physically ripened or not physically ripened. Usually, the soluble salts are removed from the emulsion after the formulation of precipitate or after physical ripening. As the means for salt removal, a noodle washing method, long well known, or a flocculation method utilizing inorganic salts containing a multivalent anion (e.g., ammonium sulfate, etc.), anionic surface active agents, anionic polymers (e.g., polystyrenesulfonic acid, etc.) or gelatin derivatives (e.g., aliphatic or aromatic acylated gelatin, etc.) can be employed.

As the silver halide emulsion, an emulsion which has not been chemically sensitized (a so-called non-after-ripened emulsion) can be used, although the emulsion can be chemically sensitized. Suitable processes for chemical sensitization include the processes described in Mees & James, supra, Glafkides, supra, or Frieser, supra, and other various known processes. That is, sulfur sensitization using the compounds containing a sulfur capable of reacting with silver ion such as a thiosulfate or the compounds described in U.S. Pat. Nos. 1,574,944, 2,278,947, 2,410,689, 3,189,458, 3,501,313, French Patent No. 2,059,245 or using active gelatin; reduction sensitization using a reducing agent such as stannous chloride described in U.S. Pat. No. 2,487,850, amines described in U.S. Pat. Nos. 2,518,698, 2,521,925, 2,521,926, 2,419,973 and 2,419,975, iminoaminomethanesulfinic acid described in U.S. Pat. No. 2,983,610 or silane compounds described in U.S. Pat. No. 2,694,639, or according to the process described in H. W. Wood, *Journal of Photographic Science,* Vol. 1, p. 163 et seq., (1953); gold sensitization using a gold complex salt described in U.S. Pat. No. 2,399,083 or gold-thiosulfate complex salt; sensitization using salts of noble metals such as platinum, palladium, iridium, rhodium, ruthenium, described in U.S. Pat. Nos. 2,448,060, 2,540,086, 2,566,245 and 2,566,263, individually or in combination, can be employed. Also, selenium sensitization described in U.S. Pat. No. 3,297,446 can be used in place or together with the sulfur sensitization.

The photographic emulsions in the light-sensitive material of the present invention can contain various additives for the purpose of preventing fog or stabilizing the photographic properties during production steps, during storage of the light-sensitive material or during development processing. That is, azoles (e.g., benzotriazole, benzothiazolium salts described in U.S. Pat. No. 2,131,038, aminobenzimidazole described in U.S. Pat. No. 2,324,123, etc.); nitroazoles (e.g., nitrobenzindazole, nitrobenzotriazole, nitrobenzimidazoles described in British Patent No. 403,789, nitroaminobenzimidazoles described in U.S. Pat. No. 2,324,123, etc.); halogen-substituted azoles (e.g., 5-chlorobenzimidazole, 5-bromoimidazole, 6-chlorobenzimidazole, etc.); mercaptoazoles (e.g., mercaptothiazole derivatives described in U.S. Pat. No. 2,824,001, mercaptobenzothiazole, the derivatives thereof described in U.S. Pat. No. 2,697,099, mercaptoimidazole derivatives described in U.S. Pat. No. 3,252,799, mercaptobenzimidazole, mercaptoxadiazole described in U.S. Pat. No. 2,843,491, mercaptothiadiazole described in U.S. Pat. No. 1,758,576, phenylmercaptotetrazole described in U.S. Pat. No. 2,403,927, etc.); mercaptopyrimidine described in U.S. Pat. No. 2,304,962; mercaptotriazine described in U.S. Pat. No. 2,476,536; mercaptotetrazaindene described in British Patent No. 893,428; various mercapto compounds (e.g., thiosalicyclic acid described in U.S. Pat. No. 2,377,375, thiobenzoic acid described in U.S. Pat. No. 3,226,231, sugar mercaptal described in Japanese Patent Publication No. 8,743/72, etc.); oxazolinethone described in U.S. Pat. No. 3,251,691; triazolothiadiazole described in Japanese Patent Publication No. 17,932/68; and the like can be added. Also, nitrogen-containing heterocyclic compounds having an anti-fogging action such as azaindene compounds (e.g., tetrazaindenes such as the compounds described in U.S. Pat. Nos. 2,444,605, 2,444,606, 2,450,397, Japanese Patent Publication Nos. 10,166/64, 10,516/67, pentazaindenes such as the compounds described in U.S. Pat. No. 2,713,541, Japanese Patent Publication No. 13,495/68); urazole compounds described in U.S. Pat. No. 2,708,161, etc., can be employed. Also, benzenesulfinic acid described in U.S. Pat. No. 2,394,198, benzenethiosulfonic acid, benzenesulfinic acid amide described in Japanese Patent Publication No. 4,136/68, sugar mercaptal described in Japanese Patent Publication No. 8,743/72, and the like can be added. Further, various chelating agents described in U.S. Pat. No. 2,691,588, British Patent No. 623,488, Japanese Patent Publication Nos. 4,941/68 and 13,496/68 can be added for preventing fog due to metal ions.

The photographic emulsions used in the light-sensitive elements of the invention can be spectrally sensitized with sensitizing dyes to blue light of longer wavelength, green light, red light or infrared light. Useful sensitizing dyes include sensitizing dyes such as cyanine, merocyanine, complex cyanine, complex merocyanine, holopolar cyanine, styryl, hemicyanine, oxonol and hemioxonol dyes. The cyanine dyes can contain basic nuclei such as pyrrolines, oxazolines, thiazolines, pyrroles, oxazoles, thiazoles, selenazoles, imidazoles and pyridines. The merocyanine dyes can contain the basic nuclei described above as well as acid nuclei such as 2-thiaoxazolidinediones, rhodanines, thiohydantoins, barbituric acids and thiobarbituric acids.

The sensitizing dyes may be used either individually or in combination. A number of combinations of sensitizing dyes are known for the purpose of supersensitization.

In the light-sensitive elements of the invention, the photographic emulsion layers or other hydrophilic colloid layers may also contain polyalkylene oxides and the ethers, esters and amines of polyalkylene oxides; polyalkylene oxide derivatives such as those described, for example, in British Patent No. 1,145,186 and Janpanese Patent Publication Nos. 10,989/70, 15,188/70, 43,435/71, 8,106/72 and 8,742/72; imidazole derivatives such as those described in Japanese Patent Publication No. 45,541/72; polymers as described in Japanese Patent Publication No. 26,471/70; 3-pyrazolidones such as those described in Japanese Patent Publication No. 27,670/70, and the like, for the purpose of increasing the sensitivity or contrast, or promoting development.

In the light-sensitive elements of the invention, the photographic emulsion layers may also contain color couplers for forming non-diffusible dye images. By the term color couplers for forming a color image (hereinafter referred to as a color coupler) is meant compounds which, upon photographic development, react with the oxidation products of aromatic primary amine developers to form dyes. The color couplers may be either 4- or 2-equivalent color couplers, as well as color couplers used for color correction or development inhibitor-releasing couplers.

Useful examples of yellow color-forming couplers include closed chain ketomethylene compounds such as acylaminoacetamides, etc. Useful magenta color-forming couplers include pyrazolones and cyanoacetyl compounds. As cyan color-forming couplers are used, for example, naphthols or phenols. The color couplers may be introduced into the photographic emulsion layers using methods usually employed for the production of multi-color light-sensitive elements.

The present invention can be applied to multilayer multi-color photographic elements having on a support at least two silver halide layers of different spectral sensitivities. Usually, multilayered natural color photographic elements have at least one red-sensitive silver halide emulsion layer, at least one green-sensitive silver halide emulsion layer and at least one blue-sensitive silver halide emulsion layer. The arrangement of these layers may be changed as desired, depending on the requirements. In general, cyan color-forming couplers are present in red-sensitive silver halide emulsion layers, magenta color-forming couplers are present in green-sensitive silver halide emulsion layers, and yellow color-forming couplers are present in blue-sensitive silver halide emulsion layers. If desired, other combinations may also be employed.

Any known processing procedures can be used for the processing of exposed light-sensitive elements of the invention. Known processing solutions may be used for the processing, and the processing may be carried out at a temperature below about 18° C or about 18 to about 50° C, as well as at a temperature above about 50° C.

The light-sensitive elements of the invention may be subjected to either a developing processing for forming silver images (black-and-white photographic processing) or a developing processing for forming color image (color photographic processing), depending on the purposes.

The developing solutions used for a black-and-white photographic processing of the light-sensitive elements of the invention may contain known developers. Examples of useful developers include dihydroxybenzenes (e.g., hydroquinone, chlorohydroquinone, etc.), 3-pyrazolidones (e.g., 1-phenyl-3-pyrazolidone, etc.), aminophenols (e.g., N-methyl-p-aminophenol, 2,4-diaminophenol, etc.), pyrogallol, ascorbic acid, 1-aryl-3-pyrazolines (e.g., 1-(p-hydroxyphenyl)-3-aminopyrazoline, 1-(p-methylaminophenyl)-3-aminopyrazoline, etc.), or the like. These developers may be used either individually or in combination.

The light-sensitive elements of the invention may be subjected to the so-called "lith-type" developing procedures. By "lith-type" developing procedures are meant processings, the development step of which is generally effected infectiously under a reduced sulfite ion concentration by using hydroxybenzenes as a developer, for the purpose of photographic reproduction of line images or photographic reproduction of halftone images by means of halftone dots. The details of lith-type processings are described in L. F. A. Mason, *Photographic Processing Chemistry*, pp. 163 to 165 (1966). The light-sensitive elements of the invention are particularly advantageous for "lith-type" processing because the dyes of the invention can be easily decolorized at a reduced sulfite ion concentration.

The fixing of the light-sensitive elements of the invention can be carried out using fixing solutions of conventional compositions. Examples of useful fixing agents include thiosulfates such as sodium thiosulfate, and thiocyanates such as ammonium thiocyanate.

Color developing solution generally comprise aqueous alkaline solutions contaning color developers. Examples of color developers usable for the color development of the elements of the invention include primary aromatic amine developers, such as phenylenediamines (e.g., N,N-diethyl-p-phenylenediamine, N-ethyl-N-($\beta$-hydroxyethyl)amino-2-methylaniline, 4-(N-ethyl-N-$\beta$-methanesulfonamidoethyl)-amino-2-methylaniline, N,N-dimethylamino-2-ethoxyaniline, etc.), p-aminophenols (e.g., 4-aminophenol, 2,6-dichloro-4-aminophenol, 2-bromo-4-aminophenol, etc.), and the like.

According to the present invention, the filter layers or antihalation layers as well as other hydrophilic colloid layers dyed for other purposes can possess sufficient absorption densities even when the thickness of those layers is reduced markedly in order to attain good definition. This is because the dyes used in the invention have both good solubility in water and compatibility with gelatin. The light-sensitive elements of the invention, particularly the dyed layers included therein, can be decolorized readily and irreversibly, leaving substantially no color stain on the light-sensitive elements after processing.

The photographic properties of the photographic emulsion layers in the light-sensitive elments of the invention are not adversely affected by the incorporation of the dyes into hydrophilic colloid layers. That is, no desensitization or softening occurs on the sensitivity or gradation of the photographic emulsion layers, except for the filtering effect due to the dyed layer itself where the dyed layer is positioned nearer to the light source than the photographic emulsion layers, and no fog is generated by the dyes, irrespective of the inherently sensitive or spectrally sensitized wavelength region of the silver halides. In addition, no adverse effects occur with the lapse of time.

The light-sensitive elements produced in accordance with the present invention possess a markedly improved sharpness compared with those of light-sensitive elements which are not produced in accordance with the invention. In particular, in the multilayer color light-sensitive elements of the invention, the dyes do not diffuse from the dyed layers and, consequently, do not reduce the sensitivity of adjacent layers, so that good color reproduction can be obtained.

The following examples are given to illustrate the present invention in greater detail.

EXAMPLE 1

In 1 liter of water was dissolved 80 g of gelatin. Aqueous gelatin solutions of dyes were prepared by adding to the above solution 80 ml of a 5% aqueous solution of poly(diethylaminoethyl methacrylate), 30 ml of a 10% aqueous solution of saponin, 50 ml of a 2% aqueous solution of chrome alum, and 400 ml of a 2% aqueous solution of the dyes of the invention or known dyes.

The thus obtained solutions were coated on cellulose triacetate photographic supports and dried for about 20 minutes to obtain a dried thickness of 4 μ. These samples were cut into pieces having a size of 6 cm², and immersed and agitated in 1 l of warm water (38° C) containing 50 ml of a 10% aqueous solution of sodium dodecylbenzenesulfonate per liter of water. After 10 to 60 minutes, the spectral absorption of the solutions used for immersion was determined. The mordanting ratio was defined as follows:

$$(1 - a_{10}/a_{60}) \times 100 = \text{Mordanting Ratio}$$

wherein $a_{10}$ and $a_{60}$ each shows the spectral absorbance at the same wavelength after 10 and 60 minutes, respectively.

The samples were then cut into pieces having a size of 6 cm², and immersed and agitated for 3 minutes in a solution (38° C) containing 50 g of sodium sulfite per liter of the solution, the pH of the solution being adjusted to 10.0 by the addition of sodium carbonate.

The spectral absorptions of these samples were determined before and after the immersion. A sample was prepared in the same manner as above, except that no dye was incorporated therein, and its spectral absorption was determined in the same manner as above. The color-remaining ratio was defined as $a_1 - a_2/a_2 - a_0$ (wherein $a_1$, $a_2$ and $a_0$ each represents the spectral absorbance at the peak wavelength of the samples containing the dyes after and before the immersion, and that of the sample which did not contain any dye before the immersion, respectively).

The following known dyes were used for the purposes of comparison.

Comparison Dyes:

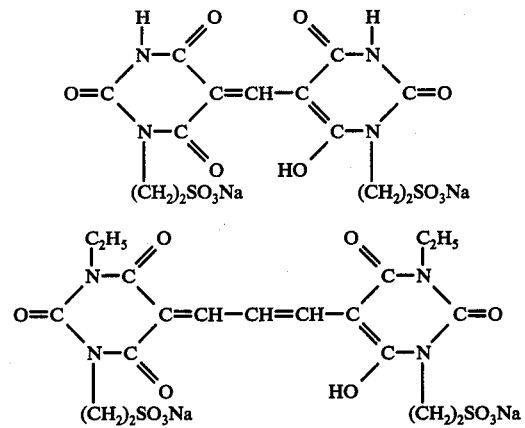

The results obtained are shown below.

| Dye Used | Mordanting Ratio | Color-remaining Ratio |
|---|---|---|
| Dye (1) | 93 | 0 |
| Dye (2) | 96 | 0 |
| Dye (4) | 95 | 0 |
| Dye (7) | 95 | 0 |
| Dye (12) | 99 | 9 |
| Dye (17) | 93 | 0 |
| Comparison Dye (A) | 71 | 0 |
| Comparison Dye (B) | 75 | 0 |

It can be understood that Dyes (1), (2), (4), (7) and (17) within the scope of the dyes of the invention are superior in both mordanting ratio and color-remaining ratio to known Dyes (A) and (B).

Dye (12) has a mordanting ratio better than any other dyes involved in the invention, but is slightly inferior in color-remaining property. However, even if a dye showed a color-remaining ratio of about 10% in this test, it can be used practically without any substantial disadvantage.

EXAMPLE 2

Onto a subbed cellulose triacetate film were coated, in succession, a silver iodobromide emulsion (silver iodide: 6 mol%) sensitized to red-light with anhydro-5,5'-dichloro-9-ethyl-3,3'-di(3-sulfopropyl)thiacarbocyanine hydroxide and containing 2,4-dichloro-3-methyl-6-[(2,4-di-tert-amylphenoxy)acetamido]phenol as a cyan color-forming coupler (weight ratio of silver to coupler: 8.0 : 1.0) at a thickness of 5 μm (coated amount of silver: 2 g/m²), a gelatin interlayer at a thickness of 1.5 μm, and a silver iodobromide emulsion (silver iodide: 6 mol%) sensitized to green-light with anhydro-9-ethyl-5,5'-diphenyl-3,3'-di(3-sulfopropyl)oxacarbocyanine hydroxide and containing 1-(2,4,6-trichlorophenyl)-3-{3-[(2,4-di-tert-amylphenoxy)acetamido]benzamido}pyrazoline-5-one as a magenta color-forming coupler (weight ratio of silver to coupler: 10 : 1) at a thickness of 4 μm (coated amount of silver: 2 g/m²). This sample was divided into five equal parts, and each of the divided samples was coated respectively with five different coating solutions having the compositions described below to form a yellow filter layer having a thickness of 2 μm (the yellow filter layers had an absorption density of 0.9 at the wavelength of their absorption maxima). A blue-sensitive silver iodobromide emulsion (silver iodide: 6 mol%) containing α-(4-methoxybenzoyl)-2-chloro-5-[α-(2,4-di-tert-amylphenoxy)butyramido]acetanilide as a yellow color-forming coupler (weight ratio of silver to coupler: 8.0 : 1.0) was further coated thereon at a thickness of 5 μm (coated amount of silver: 2 g/m²) and, finally, a protective surface layer of gelatin was coated thereon at a thickness of 1 μm. The finished samples corresponded to color negative light-sensitive elements. These samples were designated as Samples 2A to 2E, respectively, corresponding to the yellow filter layers applied thereto.

COATING SOLUTIONS FOR YELLOW COLOR FILTER LAYERS

2A

| | |
|---|---|
| Gelatin (10% aq. soln.) | 500 ml |
| Poly(2-diethylaminoethyl methacrylate (5% aq. soln.) | 220 ml |
| Dye A shown in Example 1 (10% aq. soln.) | 80 ml |

-continued

| | |
|---|---|
| Sodium Salt of 2,4-Dichloro-6-hydroxy-1,3,5-triazine (1% aq. soln.) | 25 ml |
| Dodecaethyleneglycol 4-Nonylphenol Ether (2% aq. soln.) | 30 ml |

2B

This solution had the same composition as 2A, except that 80 ml of a 10% aqueous solution of Dye (4) described hereinbefore was used in place of the solution of Dye (A) in 2A.

2C

This solution had the same composition as 2A, except that 80 ml of a 10% aqueous solution of Dye (12) shown hereinbefore was used in place of the solution of Dye (A) in 2A.

2D

This solution had the same composition as 2A, except that 80 ml of a 10% aqueous solution of Dye (19) shown hereinbefore was used in place of the solution of Dye (A) in 2A.

2E

| | |
|---|---|
| Gelatin Containing 8 g of Carey-Lea-type Yellow Colloidal silver (6% Aq. soln.) | 500 g |
| Sodium Salt of 2,4-Dichloro-6-hydroxy-1,3,5-triazine (1% aq. soln.) | 25 ml |
| Polyethyleneglycol 4-Nonylphenol Ether (2% aq. soln.) | 30 ml |

Each of the samples was exposed for 1/200 second through a color separation filter, Sp-1 manufactured by the Fuji Photo Film Co., Ltd. (the spectral transmission curve is shown in the Figure) and a continuous gray wedge using a tungsten light source having a color temperature of 5500° K, and subjected to the following processings.

| | Temperature (° C) | Time (minutes) |
|---|---|---|
| 1. Color Development | 37.8 | 3.5 |
| 2. Washing | " | 1 |
| 3. Bleaching | " | 4.5 |
| 4. Washing | " | 1 |
| 5. Fixing | " | 6 |
| 6. Washing | " | 1 |
| 7. Stabilization | " | 1 |

The processing solutions used above had the following compositions.

| | |
|---|---|
| Color Developing Solution | |
| Sodium Hydroxide | 2 g |
| Sodium Sulfite | 2 g |
| Potassium Bromide | 0.4 g |
| Sodium Chloride | 1 g |
| Borax | 4 g |
| Hydroxylamine Sulfate | 2 g |
| Tetrasodium Ethylenediaminetetraacetate | 2 g |
| 4-Amino-3-methyl-N-ethyl-N-(β-hydroxyethyl)aniline Sesquisulfate (monohydrate) | 4 g |
| Water to make | 1 l |
| Bleaching Solution | |
| Sodium Salt of (ethylenediaminetetraacetate)iron (III) Complex | 100 g |
| Potassium Bromide | 50 g |
| Ammonium Nitrate | 50 g |
| Borax | 5 g |
| Water to make | 1 l |
| Fixing Solution | |
| Sodium Thiosulfate | 150 g |
| Sodium Sulfite | 15 g |
| Borax | 12 g |

-continued

| | |
|---|---|
| Glacial Acetic Acid | 15 ml |
| Potassium Alum | 20 g |
| Water to make | 1 l |
| Stabilizing Solution | |
| Borax | 5 g |
| Sodium Citrate | 5 g |
| Sodium Metaborate (tetrahydrate) | 3 g |
| Potassium Alum | 15 g |
| Water to make | 1 l |

Photographic characteristic curves were prepared for the yellow images on each processed samples, and the amounts of exposure required for obtaining a density of 0.1 above fog were measured. Sensitivities of each sample were determined from the reciprocal of the exposure amounts corresponding to these points. The relative sensitivities and the degree of stains obtained for each sample are shown below.

| Sample No. | Relative Sensitivity to Blue Light | Stain |
|---|---|---|
| 2A | 60 | Not Stained |
| 2B | 93 | Not Stained |
| 2C | 95 | Not Stained |
| 2D | 93 | Not Stained |
| 2E | 100 | Stained |

The blue-sensitive emulsion layer in Sample 2A in which Control Dye (A) was used was desensitized considerably as compared with Control Sample 2E, because of the filtering effect due to the diffusion of the dye from the yellow filter layer to the blue-sensitive emulsion layer. Samples 2B, 2C and 2D according to the invention exhibited sensitivities substantially comparable to that of Control Sample 2E in which colloidal silver was used, and no stain occurred in contrast with Sample 2E. It can also be understood that Dye (12) can be used in practice without any problem, although it had a slightly inferior color-remaining property in the test in Example 1. In addition, Samples 2A - 2D each had a markedly improved sharpness in comparison with Sample 2E.

EXAMPLE 3

Onto subbed cellulose triacetate films were coated separately four different coating solutions having the compositions shown below to form antihalation layers having a thickness of 1 μm. Onto the films were coated, in succession, a silver iodobromide emulsion (silver iodide: 6 mol%) sensitized to red light with anhydro-5,5'-dichloro-9-ethyl-3,3'-di(3-sulfopropyl)thiacarbocyanine hydroxide and containing 2,4-dichloro-3-methyl-6-[(2,4-di-tert-amylphenoxy)acetamido]phenol as a cyan color-forming coupler (weight ratio of silver to coupler: 8.0 : 1.0) at a thickness of 5 μm (coated amount of silver: 2 g/m²), a gelatin interlayer at a thickness of 1.5 μm, a silver iodobromide emulsion (silver iodide: 6 mol%) sensitized to green light with anhydro-9-ethyl-5,5'-diphenyl-3,3'-di(3-sulfopropyl)oxacarbocyanine hydroxide and containing 1-(2,4,6-trichlorophenyl)-3-{3-[(2,4-di-tert-amylphenoxy)acetamido]benzamido}pyrazoline-5-one as a magenta color-forming coupler (weight ratio of silver to coupler: 10 : 1) at a thickness of 4 μm (coated amount of silver: 2 g/m²), a yellow filter layer having the same composition as that of yellow filter layer 2E in Example 1 at a thickness of 2 μm, a blue-sensitive silver iodobromide emulsion (silver iodide: 6 mol%) containing α-(4-methoxybenzoyl)-

2-chloro-5-[α-(2,4-di-tert-amylphenoxy)butyramido]-acetanilide as a yellow color-forming coupler (weight ratio of silver to coupler: 8.0 : 1.0) at a thickness of 5 μm (coated amount of silver: 2 g/m$^2$), and a protective surface layer of gelatin at a thickness of 1 μm. The finished samples corresponded to color negative light-sensitive elements.

These samples were designated as Samples 3A to 3D, respectively, corresponding to the kinds of antihalation layers applied thereto.

Coating Solutions for Antihalation Layers

3A

| | |
|---|---|
| Gelatin (10% aq. soln.) | 500 ml |
| Poly(2-diethylaminoethyl methacrylate) (5% aq. soln.) | 220 ml |
| Control Dye (B) (10% aq. soln.) | 32 ml |
| Sodium Salt of 2,4-Dichloro-6-hydroxy-1,3,5-triazine (1% aq. soln.) | 25 ml |
| Dodecaethyleneglycol 4-Nonylphenol Ether (2% aq. soln.) | 30 ml |

3B

This solution had the same composition as 3A, except that 32 ml of a 10% aqueous solution of Dye (1) described hereinbefore was used in place of the solution of Dye (B).

3C

This solution had the same composition as 3A, except that 32 ml of a 10% aqueous solution of Dye (5) described hereinbefore was used in place of the solution of Dye (B).

3D

| | |
|---|---|
| Gelatin (10% aq. soln.) | 500 ml |
| Sodium Salt of 2,4-Dichloro-6-hydroxy-1,3,5-triazine (1% aq. soln.) | 25 ml |
| Dodecaethyleneglycol 4-Nonylphenol Ether (2% aq. soln.) | 30 ml |

Each of the samples was exposed for 1/200 second, through a color separation filter, Sp-1 manufactured by the Fuji Photo Film Co., Ltd. (the spectral transmission curve of which is shown in the Figure) and a continuous gray wedge using a tungsten light source having a color temperature of 5500° K, and subjected to the same processings as in Example 1, except that the bleaching was effected for 6 minutes.

Photographic characteristic curves were prepared for the cyan images on each processed sample, and the amounts of exposure required for obtaining a density of 0.1 above fog were measured. The sensitivities of each sample were determined from the reciprocal of the exposure amount corresponding to this point. The relative sensitivities and degree of stains obtained for the samples are shown below.

| Sample No. | Relative Sensitivity to Red Light | Degree of Stain |
|---|---|---|
| 3A | 70 | Not Stained |
| 3B | 92 | " |
| 3C | 94 | " |
| 3D | 100 | " |

The red-sensitive emulsion layer in Sample 3A in which Control Dye (B) was used was considerably desensitized compared with Control Sample 3D, because of the filtering effect due to the diffusion of the dye from the antihalation layer to the red-sensitive layer. Samples 3B and 3C according to the invention exhibited sensitivities substantially comparable to that of Control Sample 3D. Samples 3B and 3C also each exhibited good sharpness substantially identical to that of Sample 3A.

EXAMPLE 4

Aqueous gelatin solutions of dyes were prepared by dissolving 80 g of gelatin in 1 liter of water, and then adding to this solution 80 ml of a 5% aqueous solution of poly(diethylaminoethyl methacrylate), 30 ml of a 10% aqueous solution of saponin, 50 ml of a 2% aqueous solution of chrome alum, and 400 ml of a 2% aqueous solution of the dye according to the invention (Dye 1) or Control Dye (A) described in Example 1.

The thus obtained solutions were coated on cellulose acetate photographic supports to form antihalation layers. The samples were coated with a silver chlorobromide emulsion (silver bromide content: about 17%) panchromatically sensitized by the combined use of anhydro-11-ethyl-3,3'-bis-(sulfopropyl)naphtho[1,2-d]thiacarbocyanine hydroxide and 9-ethyl-3,3'-bis(sulfobutyl)selenacarbocyanine hydroxide, and a protective gelatin layer to produce photographic elements for use in printing plate production. The photographic element containing Dye (1) was designated as Photographic Element 1, and the photographic element containing Dye (B) was designated as Photographic Element 2.

The photographic elements were subjected to step-wedge exposure, using a contact screen (133 lines per inch) closely in contact therewith, developed for 3 minutes at 20° C using a developing solution having the composition described below, and fixed, washed and dried in a conventional manner.

| Composition of Developing Solution | | |
|---|---|---|
| Water | 500 | ml |
| Sodium Sulfite (anhydrous) | 30 | g |
| Paraformaldehyde | 7.5 | g |
| Sodium Bisulfite | 2.2 | g |
| Boric Acid | 7.5 | g |
| Hydroquinone | 22.5 | g |
| Potassium Bromide | 1.6 | g |
| Water to make | 1 | l |

After processing, Photographic Element 1 had no perceptible stain, and the edge gradient of the dot image obtained had excellent dot characteristics. On the other hand, Photographic Element 2 was considerably desensitized as compared with Photographic Element 1, due to the diffusion of the dye from the antihalation layer, and the dot quality thereof was not as good as that of Photographic Element 1.

While the invention has been described in detail and with reference to specific embodiments thereof, it will be apparent to one skilled in the art that various changes and modifications can be made therein without departing from the spirit and scope thereof.

What is claimed is:

1. A silver halide photographic light-sensitive element including at least one hydrophilic colloid layer and consisting essentially of in at least one hydrophilic colloid layer thereof at least one highly mordantable dye represented by the following formula (I):

(I)

-continued

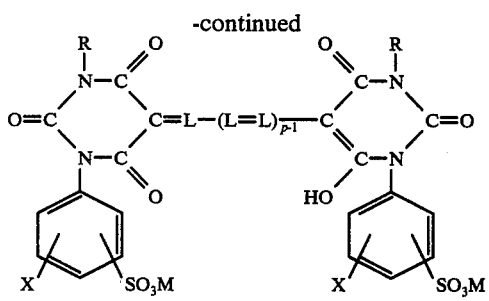

wherein R represents a hydrogen atom, an aliphatic hydrocarbon group containing 1 to 12 carbon atoms, an aromatic hydrocarbon group or an aralkyl group; X represents a hydrogen atom, a halogen atom, an aliphatic hydrocarbon group, an alkoxy group, an alkylthio group or a substituted amino group; L represents a methine group; M represents a cation; and $p$ represents an integer of 1 to 3, wherein said dye represented by the formula (I) is present in said element at about 80 to about 800 mg per m$^2$.

2. The silver halide photographic light-sensitive element of claim 1, wherein said aliphatic hydrocarbon group for R is an alkyl group or a cycloalkyl group; said aromatic hydrocarbon group for R is a phenyl group or a phenyl group substituted with one or more of a halogen atom, an alkyl group or an alkoxy group; said aliphatic hydrocarbon group for X is a lower alkyl group having 1 to 5 carbon atoms; and wherein said substituted amino group is a mono- or di-substituted amino group substituted with an alkyl group or an acyl group.

3. The silver halide photographic light-sensitive element of claim 1, wherein R represents a hydrogen atom, a methyl group, an ethyl group, an n-propyl group, an n-butyl group, an n-hexyl group, an n-octyl group, an isopropyl group, an isoamyl group, an n-dodecyl group, a cyclohexyl group, a benzyl group, a phenylethyl group, a 3-chlorophenyl group, a 4-methoxyphenyl group, or a 4-tolyl group; X represents a hydrogen atom, a chlorine atom, a bromine atom, a methyl group, an ethyl group, a propyl group, a methoxy group, an ethoxy group, a butoxy group, a methylthio group, an ethylthio group, or an amino group substituted with a methyl group, an ethyl group, an acetyl group, or a propionyl group.

4. The silver halide photographic light-sensitive element of claim 1, wherein the hydrophilic colloid layer is a silver halide emulsion layer, a filter layer or an antihalation layer.

5. The silver halide photographic light-sensitive element of claim 1, wherein R is an alkyl group containing 1 to 12 carbon atoms or a cycloalkyl group containing 4 to 6 carbon atoms.

6. The silver halide photographic light-sensitive element of claim 1, wherein said hydrophilic colloid layer contains a basic polymer.

7. The silver halide photographic light-sensitive element of claim 6, wherein said basic polymer is a water-soluble high molecular weight material containing basic groups in the main chain thereof or in a branched chain thereof and which is compatible with gelatin.

8. The silver halide photographic light-sensitive element of claim 6, wherein said basic polymer is a polymer derived from an ethylenically unsaturated compound having a dialkylaminoalkyl ester group, a maleic acid anhydride copolymer or a derivative thereof, a polymer produced by reacting a polyvinylalkylketone with aminoguanidine, a polymer containing a 2-methylimidazole nucleus in a side chain thereof, an addition polymer of bis-acrylamide and a secondary diamine or the quaternary salt thereof, or a copolymer including polyvinylpyridine or polyvinylquinoline.

9. The silver halide photographic light-sensitive element of claim 6, wherein said basic polymer is present in an amount such that about 4 to 20 basic functional groups in the basic polymer are present per mol of said dye.

10. The silver halide photographic light-sensitive element of claim 1, wherein said cation is selected from the group consisting of a hydrogen ion, an alkali metal cation, an alkaline metal cation, ammonium, or an organic onium cation.

* * * * *